(12) United States Patent
Chudoba et al.

(10) Patent No.: US 6,254,778 B1
(45) Date of Patent: Jul. 3, 2001

(54) METHOD FOR PURIFYING CARBON-CONTAINING POLLUTION AND DENITRIFYING WASTE WATER IN OXYGENIC MEDIUM

(75) Inventors: Pavel Chudoba, Le Peco; Claude Grimaud, Saint Victoret; Roger Pujol, Chatou, all of (FR)

(73) Assignee: Degremont, Rueil-Malmaison (FR)

( * ) Notice: Subject to any disclaimer, the term of this patent is extended or adjusted under 35 U.S.C. 154(b) by 0 days.

(21) Appl. No.: 09/254,173

(22) PCT Filed: Sep. 5, 1997

(86) PCT No.: PCT/FR97/01568

§ 371 Date: Mar. 2, 1999

§ 102(e) Date: Mar. 2, 1999

(87) PCT Pub. No.: WO98/11027

PCT Pub. Date: Mar. 19, 1998

(30) Foreign Application Priority Data

Sep. 10, 1996 (FR) .................................................. 96 11036

(51) Int. Cl.[7] ........................................................ C02F 3/12
(52) U.S. Cl. .......................... 210/614; 210/617; 210/616; 210/622; 210/626; 210/628; 210/197; 210/746
(58) Field of Search .................................... 210/605, 614, 210/615–617, 626, 622, 630, 746, 628, 197

(56) References Cited

U.S. PATENT DOCUMENTS 5,288,406 * 2/1994 Stein .

5,650,069 * 7/1997 Hong .

* cited by examiner

*Primary Examiner*—Chester T. Barry
(74) *Attorney, Agent, or Firm*—Connolly Bove Lodge & Hutz

(57) ABSTRACT

The invention is a biological process for purifying waste water in order to produce an effluent with a low content of carbon and of oxygenated nitrogen compounds. The process includes an initial step of mixing the waste water in a biological reactor with activated sludge to denitrify the resulting mixture. Then, air is introduced into the mixture to form an anoxic sludge thereby directly oxidizing carbon present in the anoxic sludge and removing carbon therefrom, simultaneous with the denitrification. The anoxic sludge is clarified to separate it from a denitrified intermediate effluent. The clarified anoxic sludge is recycled to the biological reactor. Then, intermediate effluent is nitrified to form a nitrified liquor and a portion of the nitrified liquor is recycled into the anoxic sludge that is present in the biological reactor, thereby subjecting the anoxic sludge to oxygen present in nitrified compounds and consequently further removing carbon from the anoxic sludge, simultaneous with the denitrification. The rate of removal of carbon is controlled as a function of the flow rate/pollution characteristics of the anoxic sludge while a redox potential of the anoxic sludge is continuously measured. A nitrate concentration of the intermediate effluent is continuously measured. There is an adjustment of an amount of air introduced into the anoxic sludge in accordance with the measured redox potential and measured nitrate concentration. A recycling flow rate of the nitrified liquor is adjusted in accordance with the measured redox potential and measured nitrate concentration. The remaining nitrified liquor is the final effluent.

24 Claims, 3 Drawing Sheets

METHOD FOR PURIFYING CARBON-CONTAINING POLLUTION AND DENITRIFYING WASTE WATER IN OXYGENIC MEDIUM

FIELD OF THE INVENTION

The present invention relates to an improved process and an improved device for biologically removing the carbon-based and nitrogenous pollution contained in effluents, in particular waste waters, by means of the coupling of a very heavily charged anoxic sludge with high-speed nitrification, in a culture bound to a fixed or mobile support.

BACKGROUND OF THE INVENTION

The processes for biologically removing nitrogenous compounds from waste waters generally include two steps: nitrification and denitrification. Nitrification is an oxidation reaction, by autotrophic bacteria, of ammoniacal nitrogen into nitrous or nitric nitrogen. The autotrophic bacteria responsible for this conversion are bacteria which grow only in the presence of oxygen. The second step, denitrification, consists of a reduction to nitrogen gas, by means of denitrifying heterotrophic bacteria, of the nitrites or nitrates produced during nitrification reactions. The denitrifying heterotrophic bacteria responsible for the conversion of nitrites or nitrates into nitrogen gas are facultative aerobic bacteria, which grow either in aerated medium in the presence of oxygen, or in anoxic medium in the absence of free oxygen, but in the presence of the constituent oxygen of nitrates and/or nitrites.

The processes for removing nitrogenous compounds from waste waters must thus include two different zones: an anoxic zone or step for the denitrification and an aeration zone or step for the nitrification.

In the water treatment sector, two forms of bacterial population can be used to carry out the biological removal of nitrogen: free cultures or bound cultures.

FIG. 1 in the attached drawings diagrammatically represents a conventional system for removing nitrogen during the treatment of waste waters. In such a system, the free culture, for example an activated sludge, is a mixture of different microorganisms in suspension, in the form of flocs. Thus, the nitrifying autotrophic bacteria are present in the same floc as the denitrifying heterotrophic bacteria and many other microorganisms. The set of microorganisms in the floc runs throughout the system, i.e. the anoxic zones 2 and aerated zone(s) 9, to be separated from the treated water 10 by decantation in the clarifier 6 and recycled 7 into the top of the system. The degree of recycling of the nitrified liquor 7 into the anoxic zone 2 is often between 100 and 600%, this value depending either on the concentration of the organic carbonate available in the waste water, or on the minimum admissible residence time in the anoxic zone 2. The major drawback of such a known configuration lies in the fact that the nitrifying autotrophic bacteria are obliged to cross the anoxic zone, in which, in the absence of oxygen, they do not reproduce.

Similarly, the denitrifying heterotrophic bacteria must cross the aerated zone, while using the dissolved oxygen as the final electron acceptor instead of nitric or nitrous nitrogen. These repeated passages in aerated medium generally have the consequence of temporarily deactivating the enzymes involved in the denitrification reactions, which is reflected by a lag time at the start of the anoxic period, corresponding to a reactivation of these enzymes. Consequently, the reaction system thus involved is not optimal and reduces the kinetics and the efficacy of the processes for removing nitrogen by free cultures.

Furthermore, the limiting step of a conventional process involving nitrifying/denitrifying activated sludge is the nitrification, since the autotrophic bacteria responsible for the conversion of the ammoniacal nitrogen into nitric and/or nitrous nitrogen have very slow growth rates. The minimum sludge age to allow a satisfactory nitrification must thus be fairly high, which has a negative effect on the denitrifying heterotrophic bacteria, which are, in contrast, most active at very low sludge ages and at very high organic loads. Thus, these so-called conventional systems are known to those skilled in the art as being processes containing a low applied load.

Moreover, it is well known by those skilled in the art that these systems are highly sensitive to load surges, but both as regards the risks of water overload (risk of loss of sludge from the decanter) and biological overload (partial inhibition of nitrification due to an excess of carbon-based pollution or to a lack of aeration).

Unlike the free cultures, the method for using the bound cultures, as illustrated by the scheme in FIG. 2 of the attached drawings, makes it possible to separate the nitrifying autotrophic populations 9 and denitrifying heterotrophic populations 2. Thus, the bacteria immobilized on a solid support are permanently in a more favorable medium, without periodic passage under conditions in which their activity would be reduced. The result of this type of implementation is to appreciably increase the kinetics of the biological reactions.

The ideal solution thus consists in separating the autotrophic and heterotrophic populations. Hitherto, this separation has only been carried out for bound cultures (Water Science and Technology, Vol. 19, 139–150, 1987; EP-A 0 293 521). As regards the sector of free cultures, the use of an activated sludge which is permanently evolving in anoxic medium, in the absence of dissolved oxygen, makes it possible to maintain a denitrifying biomass of very high activity. This fact, which is already known in the water treatment sector (Korrespondenz Abwasser, Vol. 41, No. 11, pp. 2077–2081, 1994) has, however, never resulted in an industrial application, mainly due to failure in controlling the conditions of the anoxic medium and of the degree of recycling of the nitric nitrogen.

EP-A-0 442 337 describes a biological purification process comprising three reactors in which the biomass is identical. In this prior publication, the activated sludge has a low load and it satisfies all functions: nitrification, denitrification and removal of carbon. In this prior publication, there is no separation of the heterotrophic and autotrophic biomasses.

JP-56-002,892 describes a biological treatment process comprising an anoxic (denitrification) tank coupled to the aerobic (nitrification) tank with no separation of the biomasses, the sole biomass carrying out all the functions: nitrification, denitrification and removal of carbon. Here also, this is a matter of a conventional activated sludge with a low load.

BRIEF SUMMARY OF THE INVENTION

The present invention relates to a novel configuration of the use and running of a free culture of heterotrophic bacteria, evolving in anoxic medium, referred to hereinbelow as the anoxic sludge, and its coupling with a culture of bound autotrophic bacteria, the two cultures being totally separate from each other, in two separate chambers; the bound culture serves as a source of nitrous or nitric nitrogen for the anoxic sludge.

Consequently, this invention relates to a biological process for purifying waste water in order to produce an effluent with a low content of carbon and of oxygenated nitrogen compounds, this process comprising a step of denitrification, by treatment with activated sludges, combined with a clarification operation, followed by a step of nitrification and comprising partial recycling of the nitrified effluent upstream of the step for treatment with activated sludges, this process being characterized in that the removal of carbon is carried out, during the step of treatment with activated sludges, in the same biological reactor, this removal taking place according to the flow rate/pollution characteristics of the water to be treated, in the presence:

- of oxygen constituting the nitrified compounds, the step for the removal of carbon comprising simultaneous denitrification,
- of oxygen supplied by a controlled, continuous or discontinuous aeration and thus with direct oxidation of the carbon,
- simultaneously of oxygen constituting the nitrified compounds and of oxygen supplied by the controlled, continuous or discontinuous oxidation, and thus with simultaneous denitrification and oxidation of the carbon, and in that the running of the process is ensured by continuously measuring the redox potential of the anoxic medium, this measurement being coupled:
  - to a measurement of the nitrate concentration of the intermediate effluent,
  - to a device for controlling the means for supplying feed air to the anoxic sludge, and
  - to an adjustment of the recycling flow rate of the nitrified liquor.

In the prior art relating to the technique which is the subject of the invention (Stuttgarter Berichte, Vol. 103, p. 103, 1988; Water Science & Technology, Vol. 26, No. 5/6, pp. 1097–1104, 1992; WO 93/13023; Korrespondenz Abwasser, Vol. 41, No. 11, pp. 2077–2081, 1994), an activated sludge is used, partly or totally using nitric or nitrous nitrogen as electron acceptor, these nitrogenous compounds originating, via a recycling loop, from a reactor with a nitrifying bacterial bed located downstream of the free culture.

As it is understood, the process which is the subject of the present invention differs clearly from this prior art technique:

- by specific conditions for using the free culture, allowing it to evolve permanently in anoxic medium with a very heavy applied load,
- by the simultaneous measurement of the redox potential and the concentrations of nitrates or of ammoniacal nitrogen, allowing continuous control of the system and the running of the process,
- by coupling two different systems (free culture of anoxic sludge and nitrifying bound culture) operating at a very heavy applied load.

Free cultures with a heavy or very heavy applied load present a person skilled in the art with a major advantage over systems with a low load. Such a system maintains the heterotrophic microbial population in high activity, which is reflected by very rapid nitrification kinetics, allowing the design of compact works. However, free cultures with a heavy load do not allow nitrification.

The prior art relating to the technique which is the subject of the invention does not allow the person skilled in the art to control the use and running of a process with a very heavy load.

In the case of the above references: Stuttgarter Berichte, Vol. 103, pp. 103–110, 1988 and Water Science and Technology, Vol. 26, No. 5/6, pp. 1097–1104, 1990, these are systems containing anoxic or anoxic/aerobic sludge with a low applied load, followed by nitrification in a bacterial bed which is also of low load. WO 93/13023 describes a system using an anaerobic/anoxic sludge coupled to a nitrification with a bound culture. This publication contains no indication allowing the use or control of this process and experience demonstrates that a person skilled in the art cannot control the operating of the system thus described. Thus, in this latter publication, no regulating or running device is provided, nor are there provided any means for safety aeration of the anaerobic/anoxic part, which are essential during start-up or for treating very high concentrations. Finally, the document Korrespondenz Abwasser, Vol. 41, No. 11, pp. 2077–2081, 1984 describes a process with activated sludge evolving in anoxic medium, coupled to a nitrifying bacterial bed with a low load. The anoxic part functions at applied loads of about 0.44 to 3 kg COD/kg VM.d (units: kg chemical oxygen demand/kg of volatile material and per day) but no regulation or running of the anoxic medium is suggested in that prior publication. Under these conditions, it is not possible to make the treatment reliable, in particular during periods of change in water load or under conditions of operating at high or very high anoxic load.

Measurement of the redox potential globally characterizes the redox state of the medium, while incorporating the operating conditions of the plant. The practical advantage of using this parameter to regulate processes for the removal of nitrogen by activated sludges has been pointed out on several occasions (Water Supply, Vol. 6, pp. 275–285, 1988; T. S. M. L'eau, No. 7–8, pp. 393–398, 1989; Water Science and Technology, Vol. 21, pp. 1209–1223, 1989; T. S. M. L'eau No. 4, pp. 187–194, 1992, FR-A-2 685 692).

The prior art described in the publications mentioned above essentially reveals the controlling of the aeration means by measuring of the redox potential in order to ensure the running of the processes with activated sludges in a single tank in which the aerated periods follow the periods without aeration. This type of regulation is based on varying the value of the redox potential between two thresholds: a low threshold (LT) and a high threshold (HT). The LT value, generally set at 50 mV/NHE indicates the depletion of nitrates and/or nitrites and the start of anaerobiosis. The HT value, generally between 350 and 450 mV/NHE, indicates the progression of the oxidation state of the medium and the imminent degradation of the nitrification function. In the values mentioned above, NHE means normal hydrogen electrode.

According to the prior art regarding the technique which is the subject of the invention, the aeration means are controlled by measuring the redox potential in the following way:

- when the denitrification step is complete, the nitrates and/or nitrites are converted into nitrogen gas, the LT value is reached and the aeration device switches on;
- when the nitrification step is complete, the ammoniacal nitrogen is oxidized into nitric and/or nitrous nitrogen, the HT value is reached and the aeration device is switched off.

In certain cases described in the literature, the switching on or off of the aeration device, after reaching the HT or LT values, is preceded by a short delay. In other cases (FR-A-2,685,692), an additional measurement of the nitrogen content of the effluent has the sole purpose of adjusting the HT and LT threshold values.

However, this known type of regulation has only been used in conventional systems with activated sludges, containing a single, large-volume aeration tank, to ensure the removal of nitrogen (nitrification/denitrification).

In summary, the prior art regarding the technique which is the subject of the invention reveals a regulation of the process with activated sludges by controlling the aeration means by measuring the redox potential, by means of the LT and HT values. This is the only parameter controlled by measuring the redox potential.

According to the process which is the subject of the present invention, optimized running is ensured, as will be seen below, by measuring the redox potential of the anoxic medium, coupled to a measurement of the nitrate concentration of the intermediate effluent. This measurement subsequently has an influence on two operating parameters: the recycling flow rate of the nitrified liquor and the periodic supply of feed air. In other cases (FR-A-2,685,692), an additional measurement of the nitrogen content of the effluent has the sole purpose of adjusting the HT and LT threshold values.

The kinetics of the denitrification reaction, along with its yield, depend on the ratio of the carbon-based pollution supplied by the waste water and of the concentration of recycled nitrates and/or nitrites, this ratio being expressed as COD/N-NOx applied to the anoxic reactor.

When the COD/N-NOx ratio is too low, in general below 15, the supply of organic carbon by the waste water is too low and the recycling flow rate of the nitrified liquor must thus be reduced. This reduction is controlled by measuring the redox potential, since this situation is detected by a high value of this potential, between 100 and 150 mV/NHE. On the other hand, when the COD/N-NOx ratio is too high, in general above 25, the recycling flow rate of the nitrified liquor must be increased since the mixture entering the anoxic reactor contains an excess of carbon-based pollution. This situation is indicated by a given value of the redox potential, lying in an interval from 60 to 110 mV/NHE. When the recycling flow rate is already adjusted to its maximum, the excess of the readily assimilatable carbon must be removed by supplying a sufficient amount of air. In this case, the value of the redox potential continues to fall to a given value which lies within a range from 30 to 60 mV/NHE. It is at this moment that limited amounts of air, controlled by measuring the redox potential, are supplied for a given, and thus controlled, period of time.

The recycling flow rate can advantageously be adjusted by means of measuring the nitrate concentration downstream of the anoxic reactor. This measurement characterizes the level of the treatment and indicates, via a threshold value and an alarm, that the recycling flow rate limit, which allows virtually complete denitrification, has been reached. This safety parameter can correct any deficiencies or anomalies in the operating system by controlling the recycling by measuring the redox potential.

According to one characteristic of this invention, the total water residence time of the crude effluent during the step of treatment with activated sludges (denitrification) and of the intermediate effluent during the nitrification step, without counting the recycling, is between 1.5 and 5 hours, preferably between 2 and 3 hours.

According to the invention, the concentration of the anoxic sludge during the denitrification step is between 1 and 4 g/l, preferably between 1 and 2 g/l.

According to one embodiment of the process which is the subject of the invention, the recycling flow rate of the nitrified liquor into the denitrification step is between 50 and 400%.

According to a preferred embodiment of the invention, the activated sludge and the intermediate effluent are preferably separated by lamellar decantation in a separate works, placed downstream of the reactor in which the denitrification step takes place.

According to another aspect, this invention is also directed towards a device for carrying out the process as specified above, this device being characterized in that it comprises:

a reactor containing a free culture evolving in anoxic medium in the presence of nitric or nitrous nitrogen, this reactor comprising mechanical stirring means operating continuously, means for supplying the feed air which are controlled by measuring the redox potential, and a probe for measuring the redox potential of the anoxic medium;

a clarifier, separate from the reactor, which carries out the separation of the anoxic sludge from the denitrified effluent;

a circuit for recycling the separated anoxic sludge into the said reactor containing a free culture;

a means for continuously measuring the nitrate concentration in the intermediate effluent, coupled to the recycling of the nitrified liquor, via the threshold $S_3$ in order to correct any deficiencies or anomalies of the system for regulating the recycling by measuring the redox potential, leading to incomplete denitrification;

a nitrification reactor containing a biomass bound to a fixed support (biological filter) or mobile support (fluidized bed or mobile bed) receiving the intermediate effluent originating from the clarifier with, optionally, a continuous measurement of the ammoniacal nitrogen concentration at this reactor outlet, and a circuit for recycling some of the final effluent in the reactor with a free culture containing the anoxic sludge, the recycling flow rate being controlled by measuring the redox potential of the anoxic sludge in the anoxic reactor.

According to one embodiment of the invention, the reactor for nitrifying the intermediate effluent is a nitrifying biofilter with an upward stream, operating with an extremely short water residence time (a few minutes, in particular from about 1 to 10 minutes) and with high throughputs of between 8 and 30 m/h.

According to yet another embodiment of this device, the reactor for nitrifying the intermediate effluent is a reactor containing a bound culture, of the mobile bed or fluidized bed type, using a mobile support material.

As it is understood, the process and device proposed by the present invention are characterized by dispensing with any prior decantation, thus incorporating the organic particulate pollution in the denitrification reactions, the operating being moreover characterized very advantageously by very high applied organic loads, i.e. above 3 kg COD/kg VM.d (to be compared with 0.1–0.2 kg COD/kg VM.d for the conventional systems, and with 0.4–3 kg COD/kg VM.d cited in the references mentioned above. These operating conditions make it possible to maintain a active anoxic sludge, with very high denitrification kinetics and excellent decantability of the sludges (SI: Sludge Index, more or less equal to 50 ml/g).

Thus, the removal of virtually all of the carbon-based and nitrogenous pollution is possible in a very short space of time, the overall water residence time of the untreated water according to the process which is the subject of the invention being from 1.5 to 5 hours and preferably from 2 to 3 hours.

Furthermore, these conditions, which lead to the selection of specific populations, make it possible to operate with very low sludge indices, which facilitates the separation of the anoxic sludge in a clarifier.

As has already been specified above, the principle of optimized running of the process which is the subject of the present invention is based on controlling two distinct parameters: the recycling flow rate of the nitrified liquor into the anoxic sludge and the switching on of the means for supplying the feed air in the denitrifying step. These two parameters are controlled by a continuous measurement of the redox potential of the anoxic medium, coupled to a continuous measurement of the nitrate concentration of the intermediate effluent and, optionally, to a measurement of the ammoniacal nitrogen concentration of the nitrified liquor. The redox potential characterizes the oxidation state of the medium and, indirectly, the COD/N-NOx ratio applied to the anoxic reactor. The advantage of an optimized running carried out in accordance with the process which is the subject of the invention is thus to maintain a more or less constant COD/N-NOx ratio, while at the same time keeping the redox potential of the medium between 50 and 150 mV/NHE, preferably between 80 and 110 mV/NHE. In this ratio, the COD parameter, which represents the carbon-based pollution provided by the untreated water, varies throughout the day and cannot be controlled by the operator of a purification plant. However, the N-NOx parameter, representing the flow of nitrates supplied by the recycling of the nitrified liquor, constitutes a parameter whose value can be adjusted by the operator.

The running mode used by the process which is the subject of the invention ensures not only the stability of the anoxic medium, and consequently of the biological conditions, but also makes it possible to obtain a total flow rate (waste water+recycling) which varies very little across the system. When the flow rate of the untreated water increases suddenly, for example after a shower of rain, the dilution of the organic carbon source causes a lowering of the applied COD/N-NOx ratio, which is reflected by an increase in the redox potential. This variation subsequently causes a decrease in the recycling flow rate, the total flow rate remaining relatively stable by virtue of the optimized operating system according to the invention. This operating, which is entirely characteristic of the process which is the subject of the invention, thus makes it possible to withstand surges in pollution and to take account of water overloads.

Other characteristics and advantages of the present invention will emerge from the description given below with reference to the figures of the attached drawings, in which:

FIG. 1 diagrammatically represents a conventional system for removing nitrogen during the treatment of waste water.

FIG. 2 is a diagrammatic view of vessels for separating nitrifying and denitrifying populations.

DETAILED DESCRIPTION

Figure 3:
FIG. 3 is a diagrammatic representation of the principle of the optimized running of the process which is the subject of the present invention.

Reference is made firstly to FIG. 3, which represents the principle of the optimized running of the process according to the invention.

At daybreak, the COD concentration of the waste water increases, as does the COD/N-NOx ratio applied to the anoxic reactor. This change is reflected by a lowering of the redox potential, this lowering being the factor which determines the increase in the recycling of nitrified liquor: in order to keep the COD/N-NOx ratio at an optimal value, in general between 15 and 40, and preferably between 20 and 30, the flow of nitrates and thus the recycling flow of the nitrified liquor must thus be increased. Similarly, a decrease in the COD concentration of the waste water is accompanied by an increase in the value of the redox potential. This increase indicates an excess of nitrates, relative to the carbon-based pollution available. The increasing value of the redox potential then causes a decrease in the recycling flow rate and, consequently, in the supply of nitrates into the anoxic reactor.

When the excess of organic carbon relative to the flow of nitrates is fairly high, such that the recycling flow rate is adjusted to its maximum, and when, despite this, the redox potential continues to fall below a threshold value $S_0$, the means for supplying the feed air are then actuated for a given period of time with a delay $t_0$, the value of t0 preferably being between 1 and 10 minutes. The air is supplied continuously for as long as the value $t_0$ has not been reached. Thus, the excess of the organic carbon which is not used during the denitrification reaction is simultaneously oxidized, without, however, disrupting the denitrification. The value of this threshold of the redox potential is thus within a range from 30 to 70 mV/NHE, preferably from 40 to 60 mV/NHE.

According to FIG. 3 in the attached drawings, the supply of the feed air is controlled by the threshold value $S_0$ and the recycling flow rate is controlled by a redox potential value lying between two thresholds $S_1$ and $S_2$. The value of the threshold $S_1$ is chosen between 50 and 80 mV/NHE, preferably between 60 and 70 mV/NHE, and the threshold value $S_2$ is chosen between 100 and 150 mV/NHE, preferably between 110 and 120 mV/NH. The threshold value $S_2$ corresponds to a redox state of the medium characterized by a relative excess of the supply of nitrates compared with the content of available organic carbon. In principle, this value can never be exceeded, but, in the event of a deficiency or an anomaly, an alarm is provided which is triggered in order to immediately alert the operator.

Figure 4:
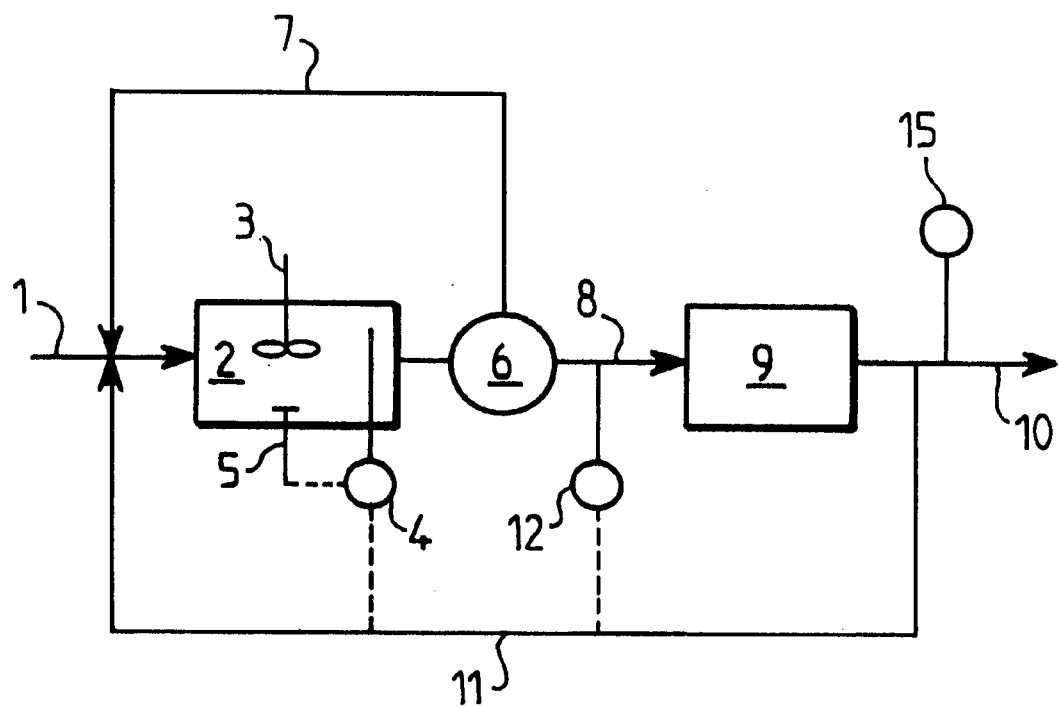
FIG. 4 is a diagrammatic representation of a device using the first embodiment of the invention.

Reference will now be made to FIG. 4, in which a first embodiment of the process, which is the subject of the invention, has been represented diagrammatically.

In this non-limiting embodiment, the untreated or mechanically pretreated water 1 in a desanding and degreasing works is sent directly and without prior decantation into the reactor 2 to be mixed with a free microbial culture, the anoxic sludge. The reactor 2 is stirred mechanically 3, with the possibility of a very limited supply of feed air, controlled by measuring the redox potential. The reaction between the organic carbon present in the untreated or pretreated water 1 and the nitric or nitrous nitrogen recycled 11 in the reactor 2 has the result of completely converting the nitric or nitrous nitrogen into nitrogen gas. The growth of the denitrifying heterotrophic bacteria is thus ensured by means of the energy supplied by this reaction. In the absence of free oxygen, the nitric or nitrous nitrogen represents the only electron acceptor available to the heterotrophic bacteria. In the presence of a very low concentration of dissolved oxygen, generally less than 0.2 mg/l, an oxidation of the organic carbon is observed, simultaneously with the anoxic denitrification. The proportion of heterotrophic bacteria capable of carrying out the denitrification reaction in the anoxic sludge is larger than that for a conventional activated sludge. This results in denitrification kinetics which are several times higher than those observed in conventional systems with a free culture, as well as substantially reduced works volumes.

The absence of a primary decanter leads to an increase in the organic load, the particulate pollution participating in the denitrification reactions. The use of the anoxic sludge is characterized by conditions of very heavy applied load, i.e. above 3 kg COD/kg VM.d, and preferably greater than or equal to 4 kg COD/kg vM.d, and by an excellent sludge index (SI more or less equal to 50 ml/g).

In order to permanently maintain anoxic conditions and to carry out optimized running of the process which is the subject of the invention, the reactor 2 is equipped with a probe 4 for measuring the redox potential of the mixed liquor, coupled to a continuous measurement of the concentration of nitric nitrogen 12. This system allows the process to operate under optimal conditions, i.e. at a constant COD/N-NOx ratio and with a value of the redox potential which ensures complete denitrification of the nitrified liquor. Controlling the feed air (5) by means of a redox potential value ($S_0$) furthermore makes it possible, under certain extreme conditions, to remove the excess carbon by oxidation, while maintaining the simultaneous denitrification.

As it is understood, the combination of a process with an anoxic sludge containing a very heavy load with a system of optimized running, based on controlling the means for recycling the nitrified liquor and for supplying the feed air by means of measuring the redox potential of the anoxic medium, makes it possible not only to obtain a high level of treatment in a compact reactor, but especially to control the process and its performance over time, even during periods of water overload (during rainfall).

The result of the treatment with the anoxic sludge is also controlled by continuously measuring 12 nitrates in the intermediate effluent, the aim of the denitrification with anoxic sludge being to obtain an intermediate effluent containing the minimum amount of residual nitrates. When a preset threshold $S_3$, preferably between 0.3 and 2 mg N-NOx/l and better still between 0.5 and 1.5 mg N-NOx/l, is reached, the signal is given to reduce the recycling of the nitrified liquor, independently of the actual value of the redox potential. An alarm can also be triggered, if, after a given time, the value of the redox potential does not decrease sufficiently. In fact, exceeding the threshold $S_3$ means that the denitrification reaction has taken place incompletely and with a decreased yield, the cause of which is probably an excessively low COD/N-NOx ratio. In this case, it is pointless to further recycle nitrates which cannot be denitrified by the anoxic sludge. The measurement of nitrates thus constitutes safety for the control system by measuring the redox potential, and its role first and foremost is to correct any deficiencies in the regulation system.

After the denitrification reaction has been accomplished, the anoxic sludge is separated from the denitrified effluent in an intermediate clarifier 6. This clarifier can be, very advantageously, a lamellar separator. The separated and concentrated anoxic sludge is then recycled 7 into the anoxic reactor. The intermediate effluent 8, rich in ammoniacal nitrogen which has not been removed by the anoxic sludge, is sent to the fixed-biomass nitrification reactor 9 characterized by a very short water residence time, and by a high applied load. On crossing this reactor, the ammoniacal nitrogen is oxidized to nitrous or nitric nitrogen by bound autotrophic bacteria. Some of the effluent 10 is then recycled 11 into the anoxic reactor 2 to be denitrified therein by the anoxic sludge. As an example of a fixed-biomass nitrification system, mention may be made of the ascending-flow aerated biofilter of the "Biofor" type sold by the present Proprietor.

Preferably, according to the invention, the concentration of the anoxic sludge in the reactor 2 is between 1 and 4 g/l and preferably between 1 and 2 g/l. The water residence time of the untreated effluent 1, without counting the recycling, in the anoxic reactor 2 is between 0.5 and 3 hours, preferably between 1 and 2 hours.

According to the invention, the overall water residence time of the effluent in the anoxic reactor 2 and of the intermediate effluent in the reactor 9, without counting the recycling, is between 1.5 and 5 hours, preferably between 2 and 3 hours.

According to one embodiment of the process which is the subject of the invention, the concentration of ammoniacal nitrogen in the final effluent is permanently controlled by a measuring device 15 placed at the reactor 9 outlet, so as to keep this concentration at a residual value of less than 2 mg N—$NH_4$/l, preferably equal to or less than 1 mg N—$NH_4$/l.

Figure 1:
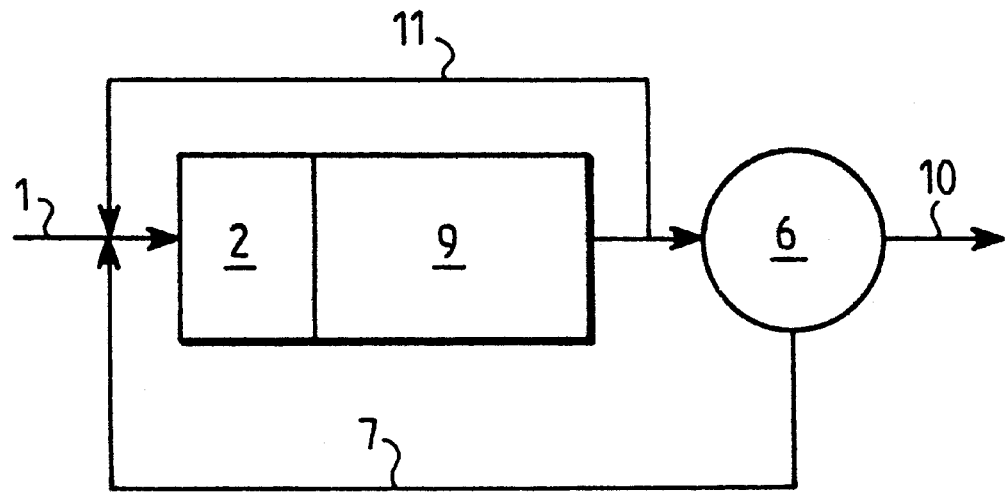
FIG. 1 is a diagrammatic view of a conventional system for removing nitrogen from waste water.
Figure 2:
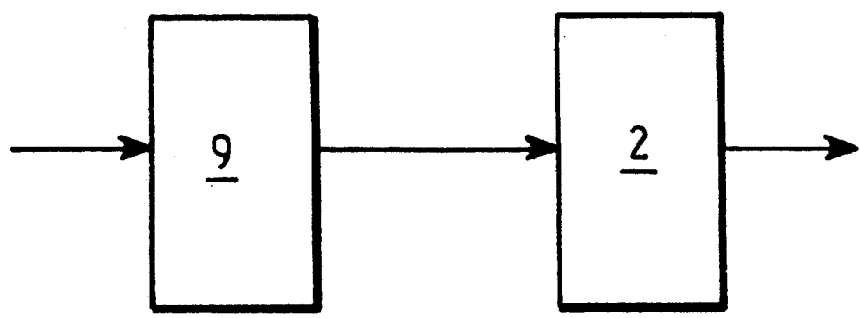
FIG. 2 is a schematic of the method for using bound cultures.
Figure 5:
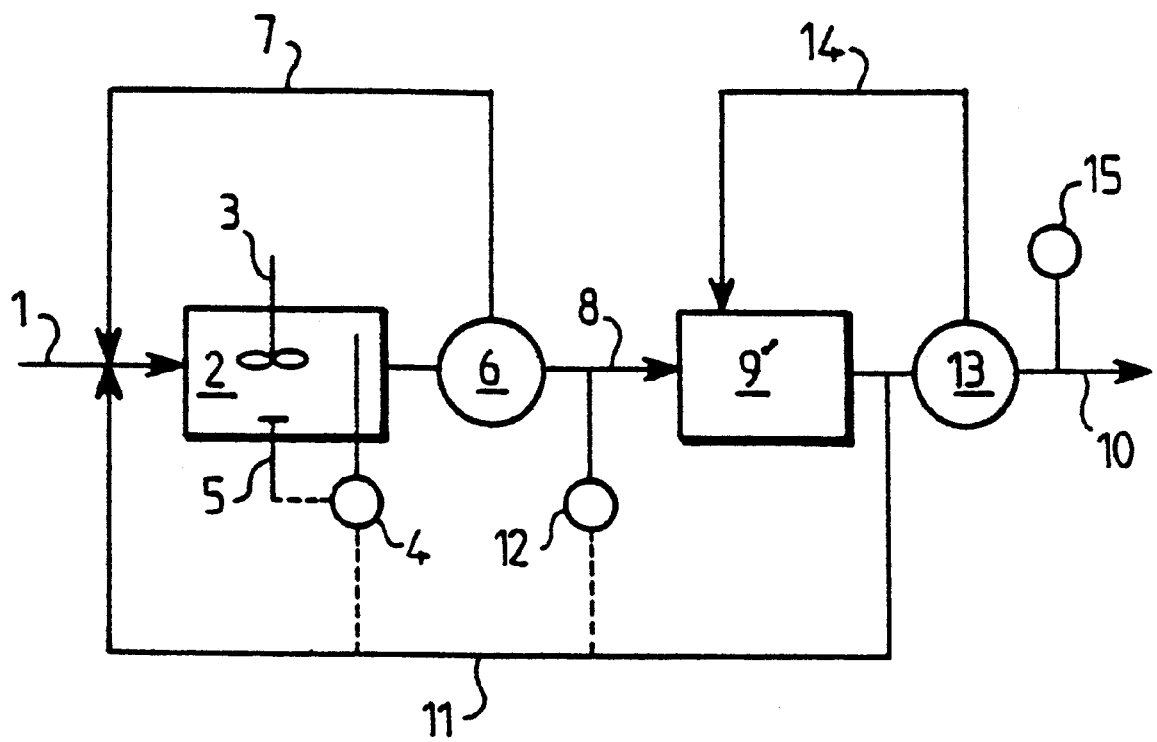
FIG. 5 is a diagrammatic view similar to that of FIG. 4, of an embodiment variant.

According to the invention, the nitrification step can also be accomplished by means of a culture of autotrophic microorganisms which is bound on or is in a mobile material. FIG. 5 shows such a configuration. In contrast with the previous configuration, a reactor containing a culture bound to a mobile material 9' is followed by a final clarifier 13 whose purpose is to retain the fraction of free culture which has escaped from the reactor 9'. As an example of a nitrification system of this type, mention may be made of a reactor with a mobile bed, for example of the type described in FR-A-2,706,883, or with a fluidized bed. In both cases, the fraction of the biomass remaining free in the reactor is only a small fraction relative to the bound biomass (<5 to 30%), and also the amount of recycled aerated autotrophic biomass 11 is very low relative to that of the conventional system of activated sludges (cf. FIG. 1). This does not therefore reduce the advantages described above for the anoxic system.

It is quite clear that the use of the process, which is the subject of the invention, is not limited solely to the configurations described above by way of example. The anoxic sludge can be in any of the configurations known to those skilled in the art, provided that it satisfies the implementation conditions described above (very heavy water load, short water residence time, optimized running, stable or optimal applied COD/N-NOx ratio, etc.).

The use of the process, which is the subject of the invention, makes it possible to separate the denitrifying biomass from the nitrifying biomass, i.e. to optimize the activity of the denitrifying heterotrophic bacteria of the anoxic sludge. The fact that they evolve constantly in anoxic medium, and especially at a stable or optimal COD/N-NOx ratio, allows them to have permanently active enzymes, even in the presence of a limited amount of dissolved oxygen, which results in very high denitrification kinetics. The high denitrification kinetics make it possible to treat larger loads, in a shorter space of time. In order to keep the denitrification potential of the culture as high as possible, the system must operate at a very high organic load, preferably equal to or greater than 3 kg COD/kg VM.d, at a very low sludge age, of about 2 to 4 days, and at an optimal COD/N-NOx ratio. The use of the anoxic sludge and its optimized running thus make it possible to substantially reduce the volume of the works, compared with conventional systems for removing nitrogen with activated sludge, the saving possibly being up to 60% of the volume of a conventional anoxic tank.

The very heavy load applied and the anoxic medium favor, on the one hand, the selection of heterotrophic species capable of denitrifying, the anoxic sludge consequently being richer in these species than a conventional activated sludge, and, on the other hand, induce better decantability of the sludge, since the medium of very heavy anoxic load is unfavorable towards filamentous bacteria. Since the anoxic sludge has excellent decantation capacities, it can thus be separated from the intermediate effluent 8 by a lamellar separator cleverly placed downstream of the anoxic reactor.

The maintenance of permanent anoxic conditions is controlled by a device based on measuring the redox potential of the medium. Measuring the redox potential makes it possible both to adjust the recycling flow rate of nitrates and/or nitrites, and consequently to prevent the medium from becoming anaerobic, to maintain the heterotrophic population at maximum activity and also to maintain the denitrification kinetics at a very high level since the COD/N-NOx ratio applied to the anoxic reactor remains more or less constant at an optimal value. Any deviation of this operating system can be corrected by measuring the nitrate content downstream of the anoxic reactor, this measurement being coupled to the recycling of the nitrified liquor. When the preset threshold $S_3$, which indicates incomplete denitrification, is reached, the recycling flow rate of the nitrified liquor is automatically reduced.

The fact that the recycling flow rate is controlled by measuring the redox state of the medium and consequently, indirectly, by quantitative and qualitative variations in the flow of the waste water, results in a very low variation of the total flow rate crossing the anoxic and nitrifying works. Thus, the process which is the subject of the present invention is capable of reliably withstanding surges in load, unlike the systems with activated sludges known in the prior art for this technique and cited in the preamble of the present description.

The advantages of the process, which is the subject of the invention, over an activated sludge are summarized in the following table:

| Parameter | Conventional anoxic zone | Anoxic sludge according to the invention |
| --- | --- | --- |
| Residence time of the untreated water (hours) | 3 | 1 |
| Concentration of the sludge (kg MS/m$^3$) | 3–5 | 1.5–2 |
| Applied load (kg COD/kg VM.d) | 0.2 | >3 |
| Load removed (kg N—NO$_3$/m$^3$.d) | 0.2 | 0.5–0.6 |
| Denitrification kinetics (mg N—NO$_3$/g VM.h) | 3–4 | 10–15 |
| Sludge index SI (ml/g) | 100–200 | 50–70 |

This table reveals in particular the very considerable economic saving in terms of volume of the works equipped with a factor of 3, by virtue, at the same time, of the high denitrification kinetics, and consequently the very low residence time of water in the system, and also a higher ascending speed of the water in the clarifier, by virtue of the low sludge index and the low sludge concentration.

Needless to say, it remains that the present invention is not limited to the modes of implementation and to the embodiments described above, but rather that it encompasses all the variants.

What is claimed is:

1. A biological process for purifying waste water in order to produce an effluent with a low content of carbon and of oxygenated nitrogen compounds, the process comprising the steps:

mixing the waste water in a biological reactor with activated sludge to denitrify the resulting mixture;

introducing air into the mixture to form an anoxic sludge thereby directly oxidizing carbon present in the anoxic sludge and removing carbon therefrom, simultaneous with the denitrification;

clarifying the anoxic sludge to separate it from a denitrified intermediate effluent;

recycling the clarified anoxic sludge to the biological reactor;

nitrifying the intermediate effluent to form a nitrified liquor;

recycling a portion of the nitrified liquor into the anoxic sludge that is present in the biological reactor, thereby subjecting the anoxic sludge to oxygen present in nitrified compounds and consequently further removing carbon from the anoxic sludge, simultaneous with the denitrification;

controlling a rate of removal of carbon as a function of the flow rate/pollution characteristics of the anoxic sludge;

continuously measuring a redox potential of the anoxic sludge;

continuously measuring a nitrate concentration of the intermediate effluent;

adjusting an amount of air introduced into the anoxic sludge in accordance with the measured redox potential and measured nitrate concentration; and adjusting a recycling flow rate of the nitrified liquor in accordance with the measured redox potential and measured nitrate concentration; and providing the remaining nitrified liquor as the final effluent.

2. Process according to claim 1, wherein the nitrification step is implemented on a culture immobilized on a fixed or mobile support.

3. Process according to claim 1 wherein the total water residence time of the waste water during treatment with the activated sludge and nitrification of the intermediate effluent, without counting the time for recycling, is between 1.5 and 5 hours.

4. Process according to claim 1 wherein the organic load applied during treatment of waste water with activated sludge is greater than or equal to 3 kg COD/kg VM.day.

5. Process according to claim 1 wherein the total flow rate of effluent passing through the system is substantially constant.

6. Process according to claim 1 wherein the waste water is of urban origin, and further wherein said waste water remains un-decanted prior to its addition to the activated sludge.

7. Process according to claim 1 wherein the waste water is of industrial origin, and further wherein said waste water is decanted prior to its addition to the activated sludge.

8. Process according to claim 1 wherein the recycling flow rate of the recycled nitrified liquor is controlled by the measurement of the redox potential and maintaining values of this potential between thresholds $S_1$ and $S_2$.

9. Process according to claim 1, wherein, when the recycling flow rate reaches its maximum value, a supply of oxygen is added to the activated sludge by continuous or discontinuous aeration, each time that a threshold $S_0$ of the redox potential is reached.

10. Process according to claim 1 wherein the recycling flow rate and oxygenation by the introduction of air to the activated sludge are controlled by simultaneous and continuous measurement of the redox potential and of the nitrate concentration of the intermediate effluent, the nitrate concentration being kept below a threshold $S_3$.

11. Process according to claim 1, wherein the recycling flow rate of the nitrified liquor is between 50 and 400%.

12. Process according to claim 1 wherein the concentration of activated sludge is between 1 and 4 g/l, preferably between 1 and 2 g/l.

13. Process according to claim 9, wherein the threshold value $S_0$ is between 30 and 70 mV/NHE.

14. Process according to claim 8, wherein the threshold value $S_1$ is between 50 and 80 mV/NHE.

15. Process according to claim 8, wherein the threshold value $S_2$ is between 100 and 150 mnV/NHE.

16. Process according to claim 10, wherein the threshold value $S_3$ is between 0.3 and 2 mg N-NOx/l.

17. Process according to claim 1, wherein the activated sludge is separated from the intermediate effluent by lamellar decantation downstream of the reactor.

18. Process according to claim 1, wherein the concentration of ammoniacal nitrogen in a final effluent is measured continuously in order to maintain it below a concentration of 2 mg N—$NH_4$/l.

19. A system for completing a biological process that purifies waste water in order to produce a final effluent with a low content of carbon and of oxygenated nitrogen compounds comprising:

an anoxic reactor containing a free culture in an anoxic sludge that includes nitric or nitrous nitrogen;

mechanical stirring means located in the reactor operating continuously;

means for supplying feed air to the reactor at a controlled rate where it is introduced into the sludge by the stirring means;

a probe for measuring the redox potential of the anoxic sludge;

means for controlling the air feed rate in response to the measured redox potential;

a clarifier located downstream of the reactor for separating the anoxic sludge from denitrified intermediate effluent;

a feedback circuit for recycling the separated anoxic sludge into the reactor;

means for continuously measuring nitrate concentration in the intermediate effluent;

a nitrification reactor containing a biomass bound to a fixed support or mobile support receiving the intermediate effluent and producing a final effluent;

a circuit for recycling a portion of the final effluent to the anoxic reactor, the recycling flow rate of which is controlled by the measured redox potential of the anoxic sludge in the anoxic reactor;

the flow rate of the recycled final effluent being decreased when a preselected nitrate concentration threshold is reached.

20. A system according to claim 19, wherein said nitrification reactor further comprises means for continuously measuring the concentration of ammoniacal nitrogen at the outlet of this reactor.

21. A system according to claim 19 wherein said nitrification reactor is an ascending-stream nitrifying biofilter with a very short water residence time.

22. A system according to claim 19 wherein said nitrification reactor contains a bound culture, of the mobile or fluidized bed type.

23. A system according to claim 19 further comprising a lamellar separator, placed downstream of the anoxic reactor, to ensure separation of the anoxic sludge from the denitrified effluent.

24. A system according to claim 19 further comprising means, located at the outlet of the nitrification reactor, for continuously measuring the concentration of ammoniacal nitrogen in the final effluent.

* * * * *